United States Patent
Line et al.

(10) Patent No.: US 10,532,677 B2
(45) Date of Patent: Jan. 14, 2020

(54) LIGHTWEIGHT MODULAR BACK AND CUSHION ASSEMBLIES

(71) Applicant: FORD GLOBAL TECHNOLOGIES, LLC, Dearborn, MI (US)

(72) Inventors: Johnathan Andrew Line, Northville, MI (US); Marcos Silva Kondrad, Macomb Township, MI (US); David Frederick Lyons, New Haven, MI (US); Kevin Wayne Preuss, Berkley, MI (US); Daniel Ferretti, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 238 days.

(21) Appl. No.: 15/341,411

(22) Filed: Nov. 2, 2016

(65) Prior Publication Data
US 2018/0118067 A1    May 3, 2018

(51) Int. Cl.
*B60N 2/64*    (2006.01)
*B60N 2/58*    (2006.01)
*B60N 2/68*    (2006.01)
*B60N 2/70*    (2006.01)

(52) U.S. Cl.
CPC ............... *B60N 2/64* (2013.01); *B60N 2/58* (2013.01); *B60N 2/68* (2013.01); *B60N 2/682* (2013.01); *B60N 2/70* (2013.01)

(58) Field of Classification Search
CPC . B60N 2/64; B60N 2/68; B60N 2/686; B60N 2/682
See application file for complete search history.

(56) References Cited

U.S. PATENT DOCUMENTS

| | | | |
|---|---|---|---|
| 5,236,247 A | 8/1993 | Hewko | |
| 6,027,171 A * | 2/2000 | Partington | B60N 2/0232 297/452.18 |
| 6,199,252 B1 * | 3/2001 | Masters | B60N 2/0224 29/91.1 |
| 7,419,209 B1 | 9/2008 | Mangiapane et al. | |

(Continued)

FOREIGN PATENT DOCUMENTS

| | | |
|---|---|---|
| CN | 201931658 | 10/2010 |
| CN | 202294387 | 9/2011 |
| CN | 203283070 | 5/2013 |

*Primary Examiner* — David R Dunn
*Assistant Examiner* — Tania Abraham
(74) *Attorney, Agent, or Firm* — Vichit Chea; Price Heneveld LLP (57) ABSTRACT

A vehicle seating assembly for a motor vehicle has a lower seat and a seat back extending upwardly from the lower seat, and includes a cushion frame assembly having a lower seat cushion frame and a seat back cushion frame. A lower seat cushion module is mounted to the lower seat cushion frame of the cushion frame assembly, the lower seat cushion module comprising an EPP-based lower seat foam core and a lower seat trim cover fitted about an external surface of at least a portion of the foam core. A seat back cushion module is mounted to the seat back cushion frame of the cushion frame assembly, the seat back cushion module comprising an EPP-based seat back foam core and a seat back trim cover fitted about an external surface of at least a portion of the foam core.

14 Claims, 9 Drawing Sheets

(56) References Cited

U.S. PATENT DOCUMENTS

| | | | |
|---|---|---|---|
| 7,874,607 B2* | 1/2011 | Weiss | B60N 2/3013 |
| | | | 296/65.01 |
| 8,157,322 B2* | 4/2012 | Daisuke | B60N 2/686 |
| | | | 297/216.13 |
| 8,540,318 B2 | 9/2013 | Folkert et al. | |
| 8,991,930 B2* | 3/2015 | Laframboise | B29C 44/12 |
| | | | 297/440.2 |
| 9,033,420 B2* | 5/2015 | Lievestro | A47C 27/15 |
| | | | 297/452.48 |
| 9,061,610 B2* | 6/2015 | Galbreath | B60N 2/2887 |
| 9,327,630 B1* | 5/2016 | Edgar | B60N 2/643 |
| 2008/0224509 A1* | 9/2008 | Demick | B60N 2/5825 |
| | | | 297/218.2 |
| 2016/0311344 A1* | 10/2016 | Smith | B60N 2/242 |

* cited by examiner

LIGHTWEIGHT MODULAR BACK AND CUSHION ASSEMBLIES

FIELD OF THE INVENTION

The present invention generally relates to a vehicle seating assembly for a vehicle, and more particularly to a vehicle seating assembly provided with lightweight modular back and cushion assemblies.

BACKGROUND OF THE INVENTION

Motor vehicle customers value and appreciate features that enhance their driving experience. In particular, consumers value and appreciate features in a vehicle seating assembly that provide additional comfort features to reduce driving stress and fatigue. Vehicle seating assemblies that include comfort components in the motor vehicle seating assembly that can provide the driver and passengers with improved comfort and increased endurance for extensive vehicle rides are desired. Additionally, the various sizes and shapes of drivers and passengers can prove challenging when designing motor vehicle seating assemblies. Accordingly, aesthetically attractive motor vehicle seating assemblies that include components optimized to accommodate the different sizes and shapes of drivers and passengers, as well as the desired posture and sitting positions of those drivers and passengers, has become increasingly important. Hence, a vehicle seating assembly which assists in providing additional comfort features to reduce driving stress and fatigue would be advantageous. Additionally, consumers are looking for such features at reasonable cost, from value oriented vehicle seating assembly applications to high performance vehicle seating assembly applications.

As a consequence, contemporary motor vehicle seating assemblies now incorporate hundreds of discrete parts. The assembly of such contemporary motor vehicle seating assemblies requires bringing together these hundreds of parts to be assembled into a final motor vehicle seating assembly, typically employing so-called "Kanban" or "Just-In-Time" ("JIT") assembly processes to achieve the completed motor vehicle seat assembly. Using such assembly processes, it is advantageous to modularize the motor vehicle seating assembly into discrete subassemblies in order to reduce the costs of final assembly. This allows the subassemblies to be sourced from a location independent of the final JIT assembly plant. An improved motor vehicle seating assembly modular design to achieve all of the needs of the motor vehicle seating assembly, particularly lightweight modular lower seat cushion assemblies and seat back cushion assemblies to provide these assembly advantages, as well as achieving a new and flexible look and styling, was desired.

SUMMARY OF THE INVENTION

One aspect of the present disclosure includes a vehicle seating assembly for a vehicle that assists in providing additional comfort features to reduce driving stress and fatigue.

Another aspect of the present disclosure includes a vehicle seating assembly for a motor vehicle has a lower seat and a seat back extending upwardly from the lower seat, and includes a cushion frame assembly having a lower seat cushion frame and a seat back cushion frame. A lower seat cushion module is mounted to the lower seat cushion frame of the cushion frame assembly, the lower seat cushion module comprising an EPP-based lower seat foam core and a lower seat trim cover fitted about an external surface of at least a portion of the foam core. A seat back cushion module is mounted to the seat back cushion frame of the cushion frame assembly, the seat back cushion module comprising an EPP-based seat back foam core and a seat back trim cover fitted about an external surface of at least a portion of the foam core.

Yet another aspect of the present disclosure includes a seat assembly comprising a cushion frame assembly and a seat cushion module mounted to the cushion frame assembly, wherein the seat cushion module comprises an EPP-based foam core and the seat cushion module comprises an inner bearing surface proximate each of a pair of lateral outer side edges of the seat cushion module to create an interference fit with an inner perimeter of the cushion frame assembly.

A further aspect of the present disclosure includes a vehicle seating assembly for a motor vehicle having a lower seat and a seat back extending upwardly from the lower seat. The vehicle seating assembly comprises a cushion frame assembly having a lower seat cushion frame and a seat back cushion frame, a lower seat cushion module mounted to the lower seat cushion frame of the cushion frame assembly, the lower seat cushion module comprising an EPP-based lower seat foam core and a lower seat trim cover fitted about an external surface of at least a portion of the foam core, and a seat back cushion module mounted to the seat back cushion frame of the cushion frame assembly, the seat back cushion module comprising an EPP-based seat back foam core and a seat back trim cover fitted about an external surface of at least a portion of the foam core. Each of the lower seat cushion frame and seat back cushion frame of the cushion frame assembly comprise an outer frame member and each of the lower seat cushion module and the seat back cushion module comprise an inner bearing surface proximate each of a pair of lateral outer side edges of the lower seat cushion module in the seat back cushion module to create an interference fit with an inner perimeter of the outer frame member of the lower seat cushion frame and seat back cushion frame.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
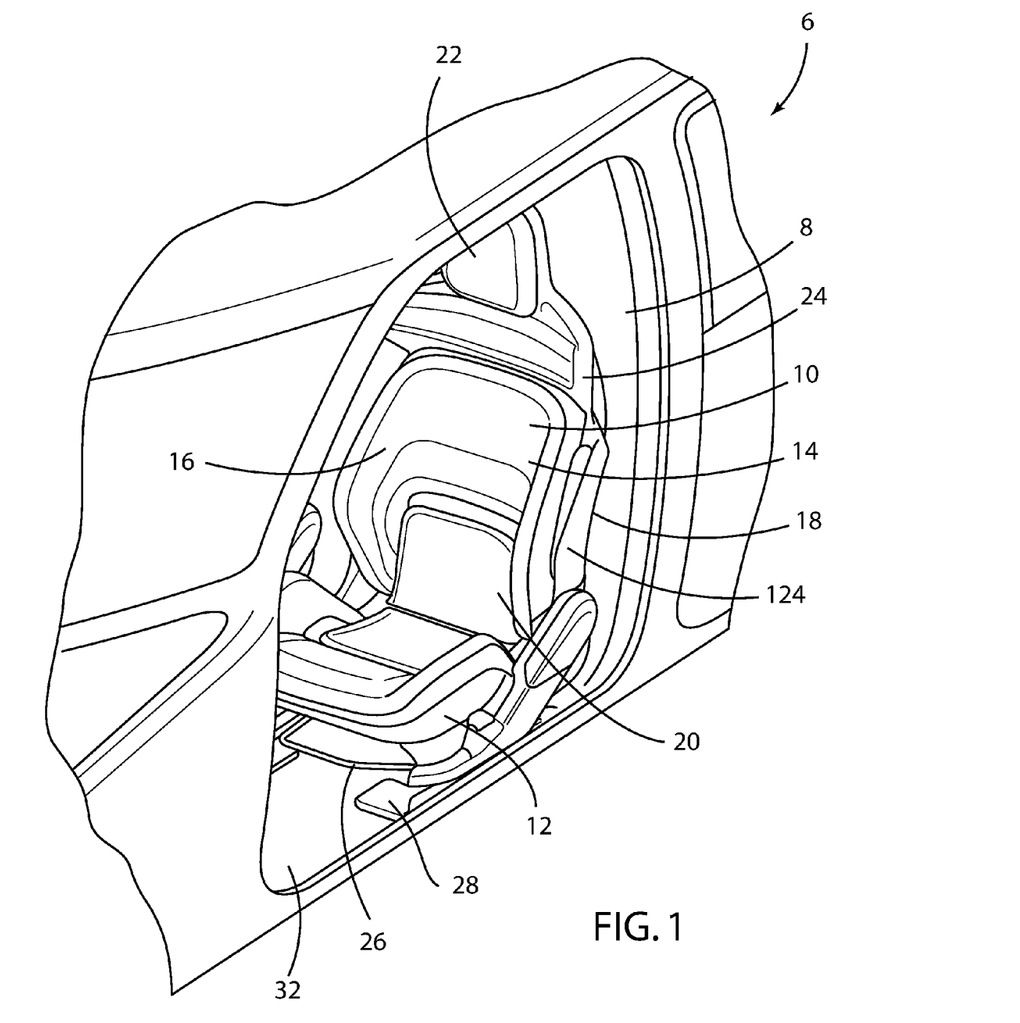
FIG. 1 is a perspective view of a vehicle seating assembly in accordance with the present disclosure installed in the motor vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
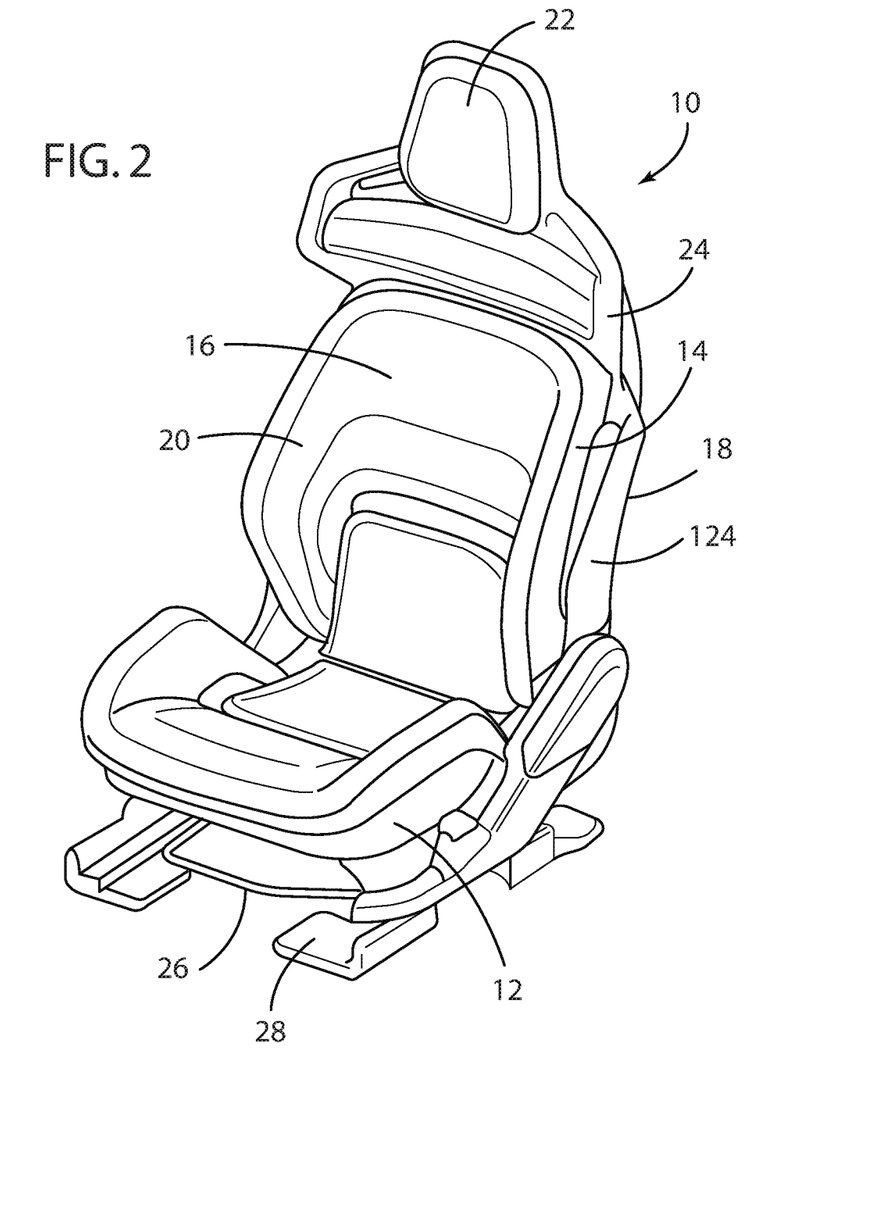
FIG. 2 is a perspective view of the vehicle seating assembly in accordance with the present disclosure.

Referring to FIGS. 1 and 2, a vehicle seating assembly 10 is illustrated inside the vehicle cabin 8 of a motor vehicle 6. The motor vehicle seating assembly 10 may be a seat for a driver, a seat for a passenger, a rear bucket seat, a rear row of seats, as shown, or any other vehicle seat. The vehicle seating assembly 10 includes a lower seat 12 and a seat back 14 pivotably attached to the lower seat 12. The seat back 14 of the vehicle seating assembly 10 includes a forward facing surface 16 and a rearward facing surface 18, each of which may be covered with a protective and/or decorative material 20, as further discussed herein below. The vehicle seating assembly 10 also includes a headrest 22 operably coupled to an upper portion 24 of the seat back 14 of the vehicle seating assembly 10. The vehicle seating assembly 10 also typically includes a vehicle seat base 26 configured to provide structural support to the vehicle seating assembly 10. The vehicle seat base 26 is preferably supported on seat mounting rail assemblies 28, as is known in the art. The seat mounting rail assembly 28 is configured to allow the vehicle seating assembly 10 to be adjusted in forward and rearward directions relative to the longitudinal axis of the motor vehicle 6.

It is understood that the vehicle seating assembly 10 may be positioned in various locations throughout the motor vehicle 6 other than the illustrated position, such as a passenger side location, a mid-row location, and a rear seat location. The vehicle seating assembly 10 is thereby slidably coupled with a floor 32. It is also conceivable that the vehicle seating assembly 10 may not include the seat mounting rail assembly 28 and alternatively may be fixedly coupled with the floor of the vehicle.

It is also understood that the vehicle seating assembly 10 may be configured in different forms and styles. For example, as shown in FIGS. 1 and 2, the vehicle seating assembly 10 is designed for installation in a motor vehicle 6 having relatively high performance characteristics, where the lower lumber support has been modified to provide a more inclined lumber support. Also, the lower seat 12 has been modified to extend further forward to provide greater support of the occupant's thighs.

The vehicle seating assembly 10 is primarily supported by a cushion frame assembly 30, which includes a lower seat cushion frame 34 and a seat back cushion frame 36. The lower seat cushion frame 34 includes a mount 38 to which a seat belt buckle 40 is attached. A suspension system 42 may be disposed within a rear portion 44 of the lower seat cushion frame 34 beneath and juxtaposed with a lower seat cushion module 46 disposed above for support of the occupant, which shares a common construction with the seat back cushion module 48, as further discussed below.

The suspension system 42 is preferably formed from variable tension springs 50 which support a central panel 52. Preferably, at least one variable tension spring 50 is mounted to the cushion frame assembly 30. The suspension system 42 may also include a motor 54, a gear 56, and a spring attachment member 58. A fixedly mounted connecting rod 60 extends between a pair of parallel lateral outer frame members 62, 64 and a sleeve 66 rotatably encircles the connecting rod 60. The motor 54 and gear 56 are operably coupled to the sleeve 66 and the spring attachment member 58 is rigidly mounted on the sleeve 66.

Figure 5:
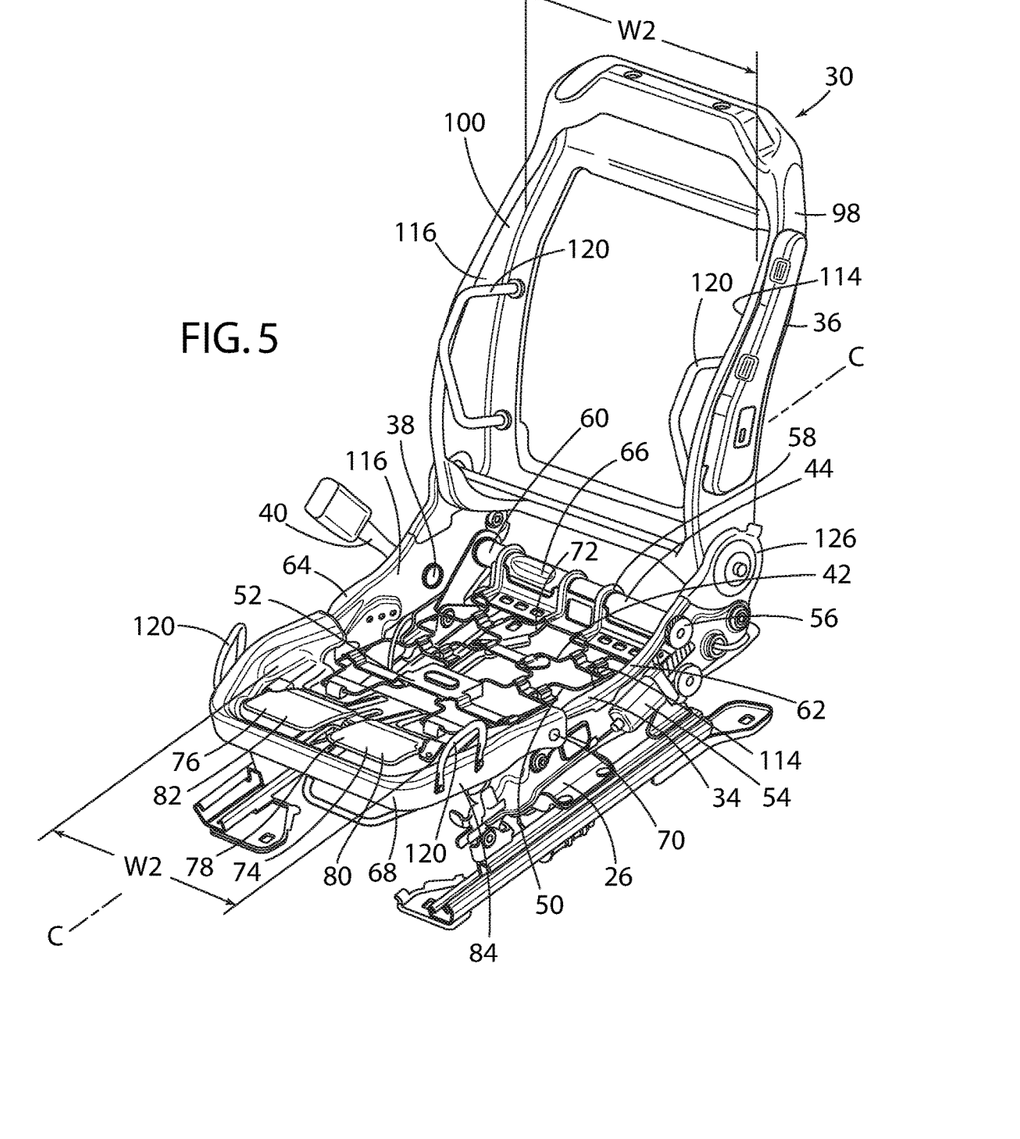
FIG. 5 is a front perspective view of the cushion frame assembly in accordance with the present disclosure.
Figure 6:
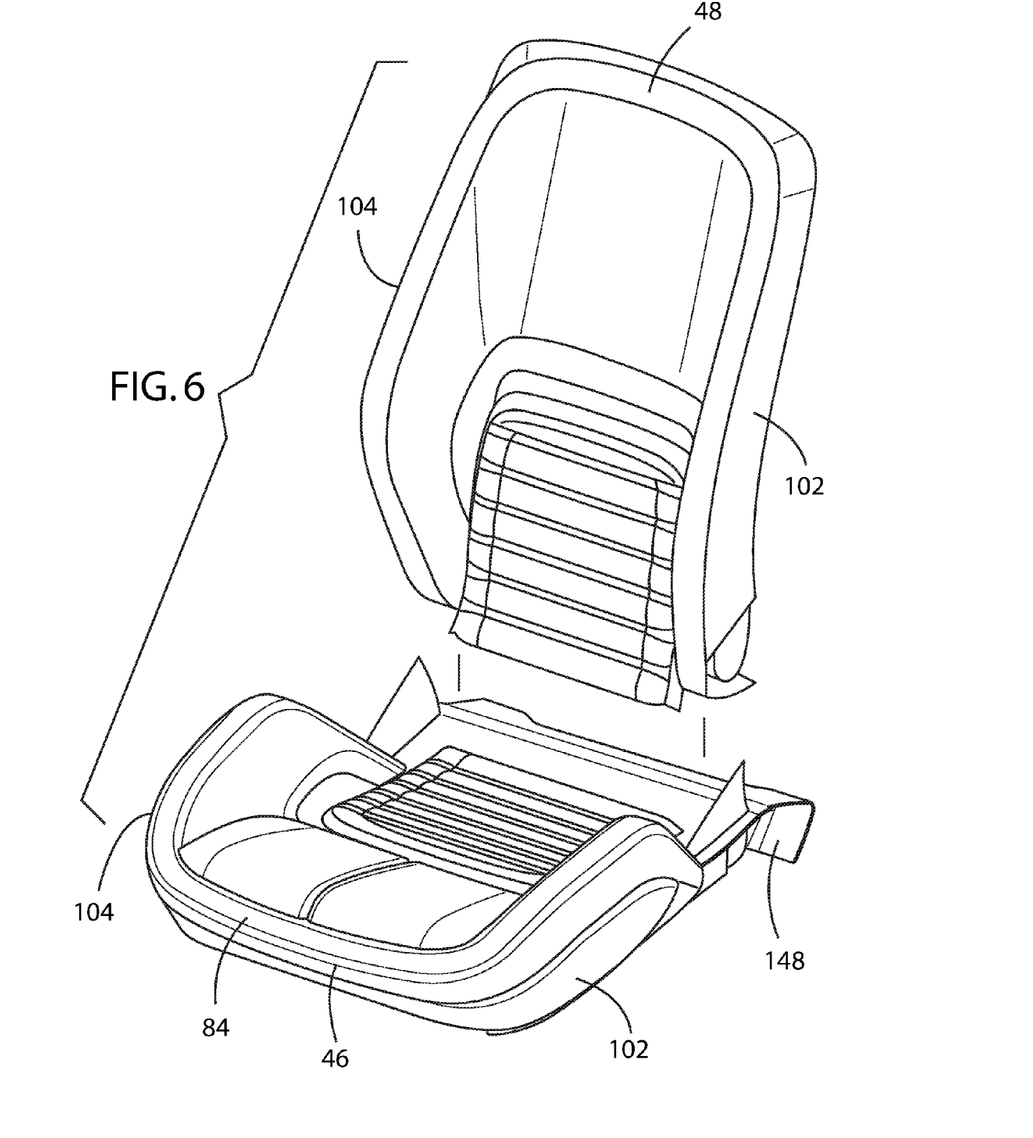
FIG. 6 is a front perspective view of the separated lower seat cushion module and seat back cushion module in accordance with the present disclosure.
Figure 7:
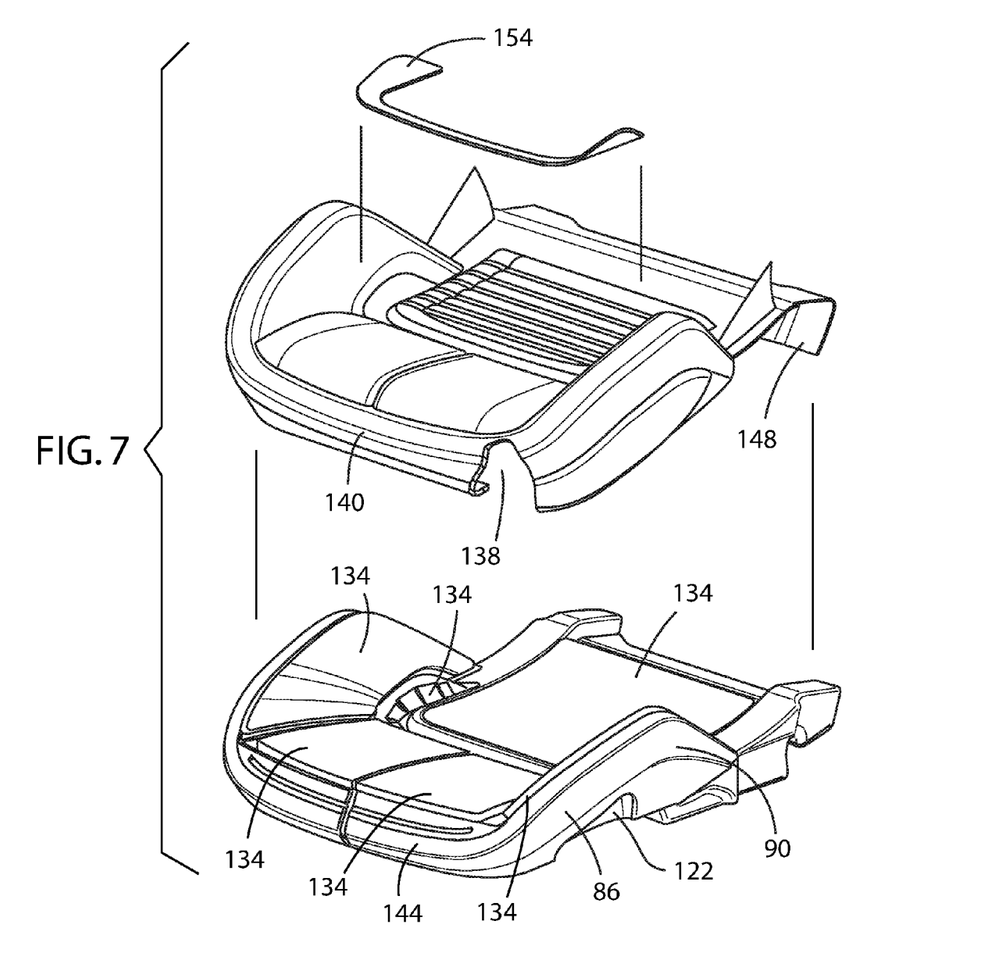
FIG. 7 is a front perspective exploded view of the lower seat cushion module in accordance with the present disclosure.
Figure 8:
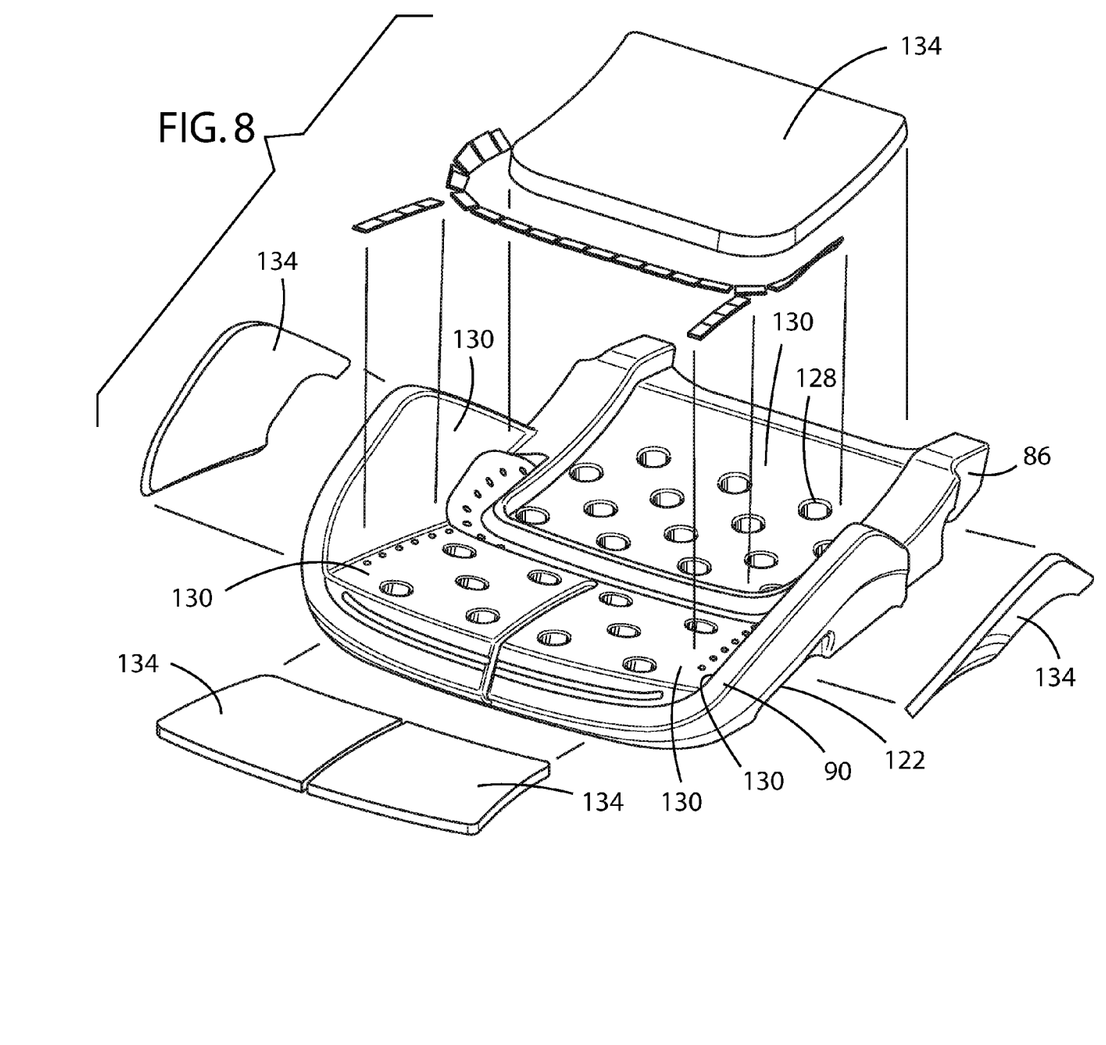
FIG. 8 is a front perspective exploded view of the foam core of the lower seat cushion module in accordance with the present disclosure.
Figure 9:
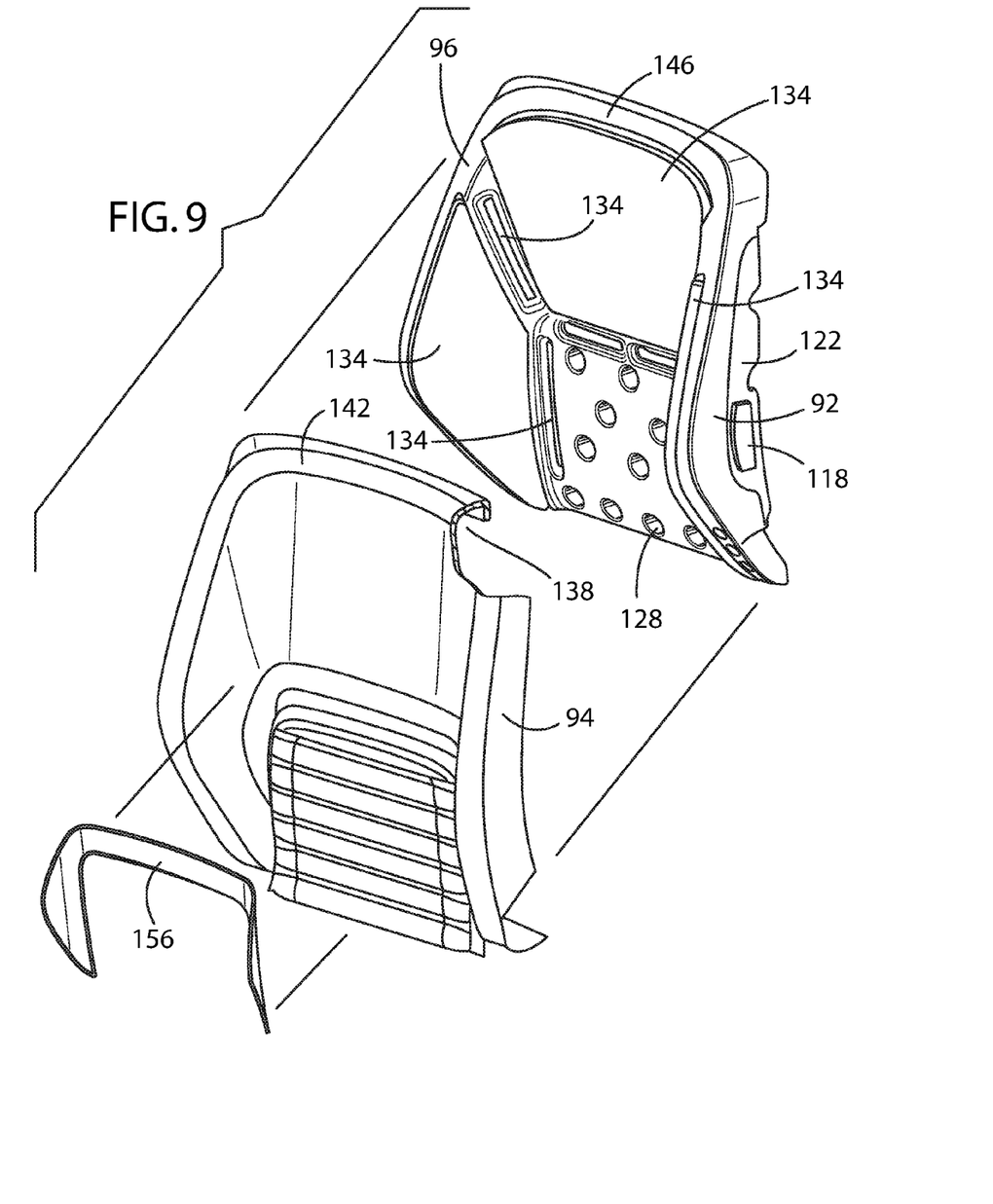
FIG. 9 is a front perspective exploded view of the seat back cushion module in accordance with the present disclosure.
Figure 10:
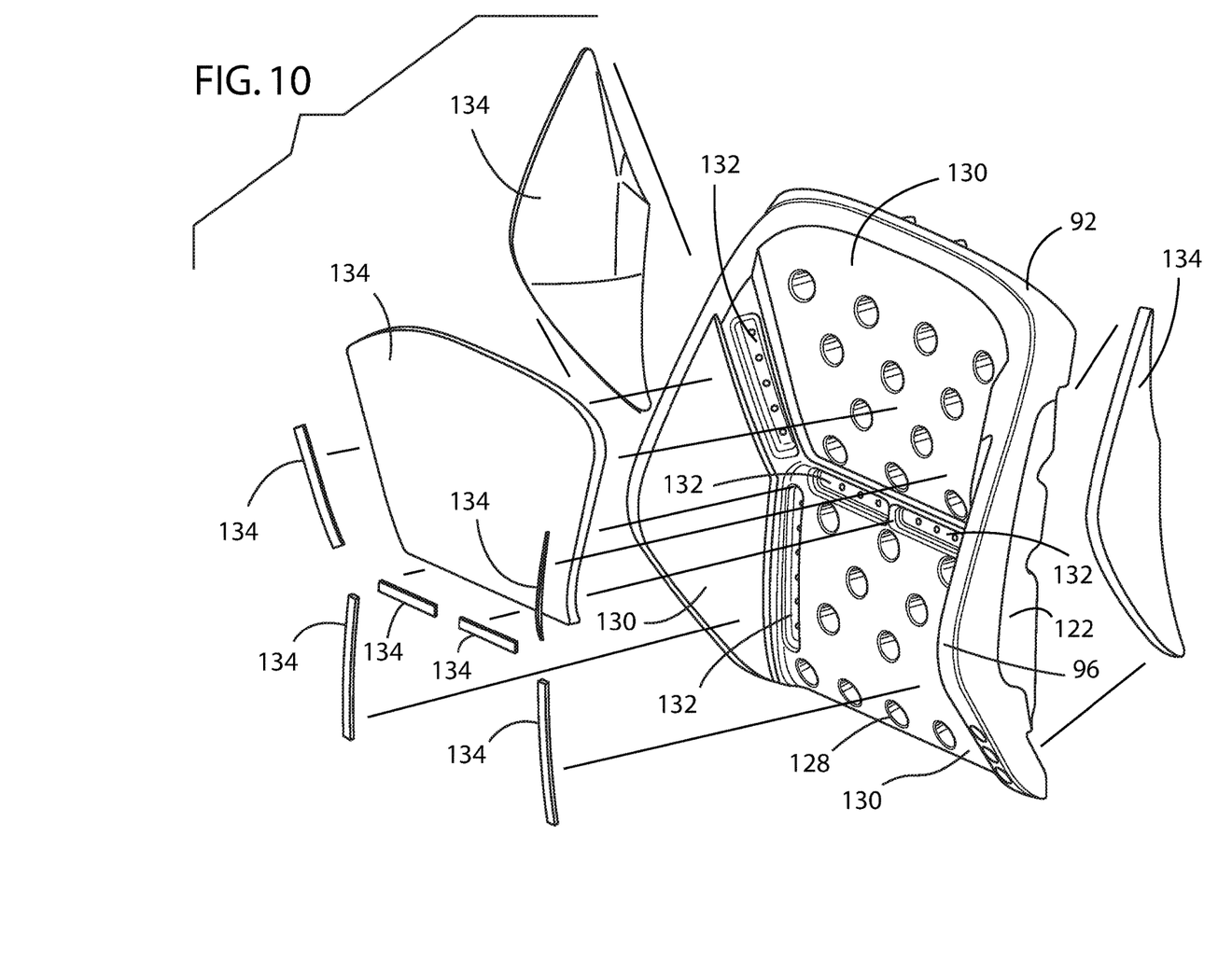
FIG. 10 is a front perspective exploded view of the foam core of the seat back cushion module in accordance with the present disclosure.

As shown in FIG. 5, the variable tension springs 50 are mounted in tension between the spring attachment member 58 and a cushion pan 68 mounted to and forming a forward portion of the lower seat cushion frame 34. Preferably, the cushion pan 68 is pivotably, and thereby adjustably, mounted to the lower seat cushion frame 34 by a pair of pivots 70 located on either side of the lower seat cushion frame 34 of the cushion frame assembly 30. The cushion pan 68 so mounted may be manually and pivotally adjusted by use of a knob or lever (not shown), as is well known in the seating arts, or a remotely pivotally adjusted by use of a motorized gear assembly (not shown), as is also well known in the seating arts.

When activated, the motor 54 and gear 56 are adapted to rotate the sleeve 66 and spring attachment member 58. In the illustrated example, rotating the sleeve 66 and spring attachment member 58 rearward raises a rear portion 72 of the variable tension springs 50 and increases the tension applied to the variable tension springs 50. Raising the rear portion 72 of the variable tension springs 50 also raises the height of the seating surface. Additionally, as is understood by one of ordinary skill in the art, increasing the tension on the variable tension springs 50 decreases the flex or extension thereof, which means the variable tension springs 50 and lower seat cushion module 46 will move downward a smaller distance when placed under load, such as when an occupant sits on the vehicle seating assembly 10.

Conversely, rotating the sleeve 66 and spring attachment member 58 forward lowers the rear portion 72 of the variable tension springs 50 and decreases the tension applied to the variable tension springs 50. This increases the flex or extension of the variable tension springs 50, which means the variable tension springs 50 and lower seat cushion module 46 will move downward a greater distance when an occupant is seated in vehicle seating assembly 10. Further, lowering the rear portion 72 of the variable tension springs 50 lowers the height of the seating surface.

Preferably, the lower seat cushion frame 34 of the cushion frame assembly 30 includes a pair of resilient independent thigh supports 74, 76 symmetrically disposed along either side of a longitudinal centerline C of the vehicle seating assembly 10 and operably coupled to the cushion pan 68. For example, a cushion leg jounce bracket 78 can be mounted to the cushion pan 68 and can be provided with a pair of the jounce paddles 80, 82 disposed beneath the lower seat cushion module 46. Each of the pair of resilient independent thigh supports 74, 76 has a predetermined hysteresis support-curve to provide independent and resilient support for each thigh of an occupant's legs.

The lower seat cushion module 46 is disposed above and is operably coupled to the lower seat cushion frame 34 of the cushion frame assembly 30, such that a forward portion 84 of the lower seat cushion module 46 is resiliently supported by the pair of resilient independent thigh supports 74, 76. The resilient independent thigh supports 74, 76 provide passive support and act independently under the load of each leg, and thereby reduce leg muscle fatigue and provide support for important vehicle functions, especially such as acceleration and braking with the right leg and manual gear shift or relaxation on the left leg.

The lower seat cushion module 46 and the seat back cushion module 48 are preferably operably coupled with the cushion frame assembly. The lower seat cushion module 46 is mounted to the lower seat cushion frame 34 of the cushion frame assembly 30, while the seat back cushion module 48 mounted to the seat back cushion frame 36 of the cushion frame assembly 30. In accordance with the present disclosure, the lower seat cushion module 46 comprises an EPP-based lower seat foam core 86 and a lower seat trim cover 88 fitted about an external surface 90 of at least a portion of the lower seat foam core 86. The seat back cushion module 48 likewise comprises an EPP-based seat back foam core 92 and a seat back trim cover 94 fitted about an external surface 96 of at least a portion of the seat back foam core 92.

The EPP-based lower seat foam core 86 and EPP-based seat back foam core 92 are preferably formed as an integrated single piece molded component that can be adapted to a wide variety of seating configurations to provide a lightweight foam core. Each of the lower seat trim cover 88 and the seat back trim cover 94 are likewise preferably fabricated as a single component from a protective and/or decorative material 20, as further discussed herein below. Leather and/or vinyl are often and preferably employed. The lower seat trim cover 88 and seat back trim cover 94 preferably comprise an integrated form-fitting outer skin that closely mirrors the exposed shape and contours of the lower seat foam core 86 and seat back foam core 92 when installed over the lower seat foam core 86 and the seat back foam core 92, respectively.

As shown in FIG. 5, the seat back cushion frame 36 of the cushion frame assembly 30 also comprises a pair of parallel lateral outer frame members 98, 100. In turn, each of the lower seat cushion module 46 and the seat back cushion module 48 comprise a pair of lateral outer side edges 102, 104 and an outer flange 106, 108 along each of the pair of lateral outer side edges 102, 104. The outer flange 106, 108 is supported by the parallel lateral outer frame members 62, 64, 98, 100 of the cushion frame assembly 30 when the lower seat cushion module 46 and the seat back cushion module 48 are assembled with the cushion frame assembly 30.

Each of the foam cores 86, 92 of the lower seat cushion module 46 and the seat back cushion module 48 preferably comprise an inner bearing surface 110, 112 proximate and slightly inward of the lateral outer side edges 102, 104 of each of the lower seat cushion module 46 and the seat back cushion module 48 to create an interference fit with an inner perimeter 114, 116 of each of the parallel lateral outer frame members 62, 64, 98, 100 of the lower seat cushion frame 34 and seat back cushion frame 36 of the cushion frame assembly 30. In order to obtain such an interference fit, each of the foam cores 86, 92 of the lower seat cushion module 46 and the seat back cushion module 48 have a first lateral width W1 between the inner bearing surfaces 110, 112 proximate each of the pair of lateral outer side edges 102, 104. Each of the lower seat cushion frame 34 and seat back cushion frame 36 of the cushion frame assembly 30 has a second lateral width W2 between the inner perimeter 114, 116 of the lower seat cushion frame 34 and seat back cushion frame 36 of the cushion frame assembly 30. The interference fit is obtained by forming the first lateral width W1 to exceed the second lateral width W2 prior to installation of the seat cushion modules 46, 48 within the cushion frame assembly 30.

Preferably, the inner bearing surfaces 110, 112 of each of the pair of lateral outer side edges 102, 104 of the foam cores 86, 92 of the lower seat cushion module 46 and the seat back cushion module 48 further comprises a resilient member 118 that resiliently engages each parallel lateral outer frame member 62, 64, 98, 100 of the lower seat cushion frame 34 and seat back cushion frame 36 of the cushion frame assembly 30 subsequent installation of the seat cushion modules 46, 48 within the cushion frame assembly 30. In effect, the combination of the interference fit and the resilient member 118 provides an interface that snaps the lower seat cushion module 46 and the seat back cushion module 48 onto the cushion frame assembly 30.

Figures 3, 4:
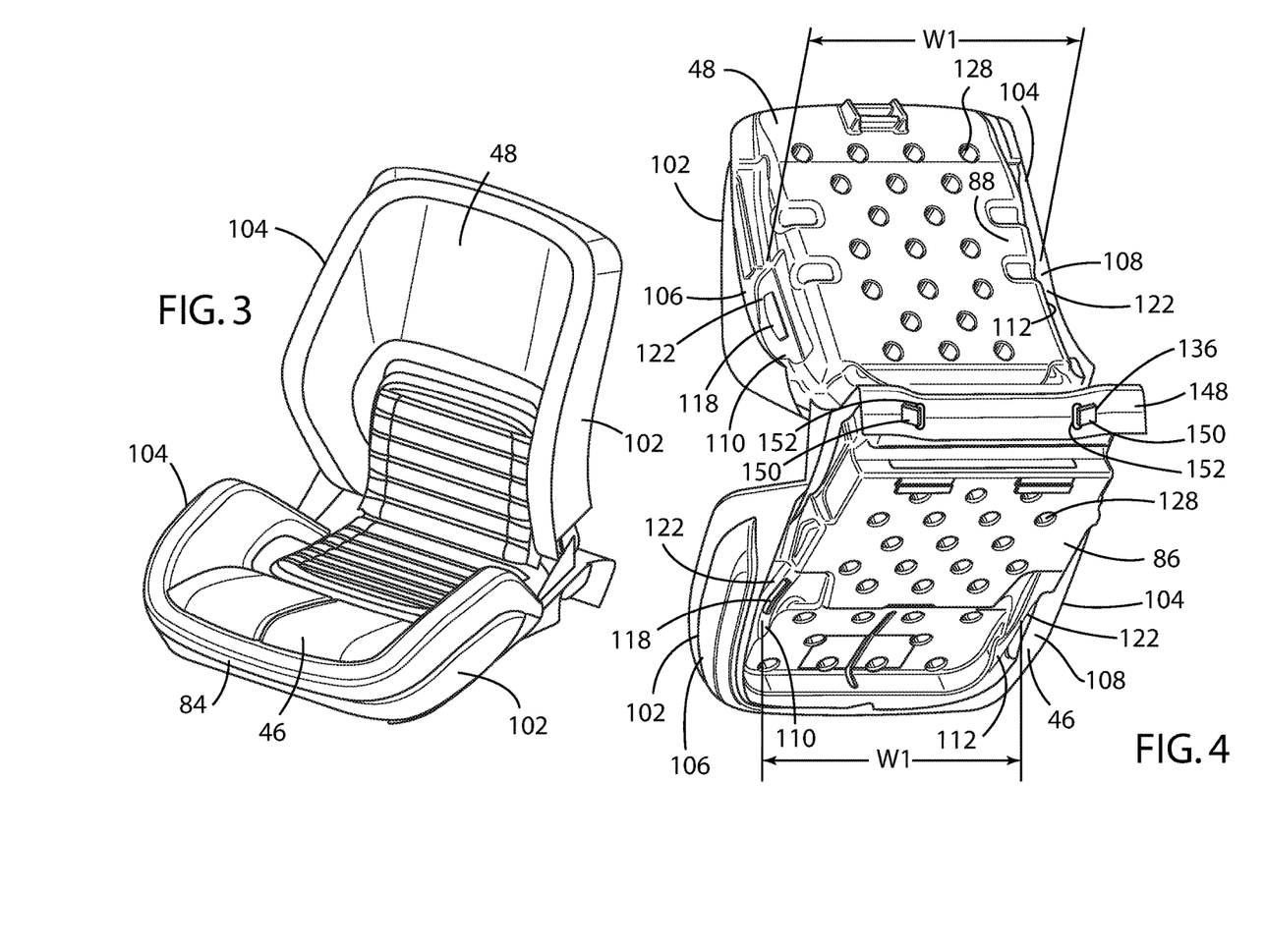
FIG. 3 is a front perspective view of the lower seat cushion module and seat back cushion module of the vehicle seating assembly in accordance with the present disclosure.
FIG. 4 is a rear perspective view of the lower seat cushion module and seat back cushion module of the vehicle seating assembly in accordance with the present disclosure.

In addition, each of the parallel lateral outer frame members 62, 64, 98, 100 of the lower seat cushion frame 34 and seat back cushion frame 36 of the cushion frame assembly 30 comprise a bolster armature 120, as best seen in FIG. 5. The bolster armature 120 is preferably formed from a bent metal rod that is attached at either end to the parallel lateral outer frame members 62, 64, 98, 100 as best seen in FIG. 5. In turn, each of the foam cores 86, 92 of the lower seat cushion module 46 and the seat back cushion module comprise 48 a recess 122 along each lateral outer side edge 102, 104 corresponding with and adapted to receive the bolster armature 120, as best seen in FIG. 4. Preferably, the recess 122 along each lateral outer side edge 102, 104 of each of the foam cores 86, 92 of the lower seat cushion module 46 and the seat back cushion module 48 is formed during the molding of each of the EPP-based lower seat foam core 86 and the EPP-based seat back foam core 92.

The interface of the lower seat cushion module 46 and seat back cushion module 48 with the cushion frame assembly 30 provides a very effective structure by which to provide lateral and fore/aft support. That is, the molded-in nesting configuration employs the structure of the cushion frame assembly 30 to reinforce and significantly strengthen the lower seat cushion module 46 and the seat back cushion module 48, particularly during passenger ingress/egress. Preferably, a decorative rear seat back panel 124 can be attached to the rear 126 of the cushion frame assembly 30 that interference with the seat back cushion module 48 in a clamshell arrangement, as shown in FIG. 2, to form the rearward facing surface 18 of the seat back and otherwise provide an aesthetically pleasing fit and finish of the finally assembled seat back 14.

As best shown in FIGS. 4, 8, 9 and 10, each of the EPP-based lower seat foam core 86 and the EPP-based seat back foam core 92 are provided with a plurality of evenly distributed holes 128. Preferably, the plurality of evenly distributed holes 128 forms a regular pattern and each of the plurality of evenly distributed holes 128 is at least 25 mm diameter wide. The plurality of evenly distributed holes 128 in the EPP-based lower seat foam core 86 and the EPP-based seat back foam core 92 provide weight reduction, air-distribution, and thermal comfort improvements.

Each of the foam cores 86, 92 of the lower seat cushion module 46 and the seat back cushion module 48 also comprise a plurality of planar recesses 130 and trenches 132 that are each adapted to receive a die cut comfort pad 134 disposed between each of the EPP-based lower seat foam core 86 and the lower seat trim cover 88 and the EPP-based seat back foam core 92 and the seat back trim cover 94, respectively. Preferably, the die cut comfort pads 134 comprise die cut Mueller pads of varying and selectable thicknesses. For the lower seat cushion module 46, the major comfort pads 134 are preferably disposed within the planar recesses 130 as a single comfort pad 134 below the buttocks area, a pair of comfort pads 134 forward beneath the thighs, and a pair of lateral comfort pads 134 slightly forward of the hip area. A plurality of smaller comfort pads 134 is arranged about gaps created between the major comfort pads within a plurality of the trenches 132. For the seat back cushion module 48, the major comfort pads 134 are preferably disposed as a single comfort pad 134 within the planar recesses 130 behind the cervical area and a pair of lateral comfort pads 134 along each side. A plurality of smaller comfort pads 134 are arranged about gaps created between the major comfort pads 134 and are likewise disposed in a plurality of the trenches 132.

Once the variable and selectable comfort pads 134 are selected and installed on the foam core 86, 92, the trim cover 88, 94 for each of the lower seat cushion module 46 and the seat back cushion module 48 is installed about the form core 86, 92. The comfort pads 134 may be held in place during the assembly process by any permanent or temporary adhesive, such as by double back tape. Preferably, at least one of the EPP-based lower seat foam core 86 and the EPP-based seat back foam core 92 comprises a molded-in attachment feature 136 for attachment of the trim cover 88, 94. More preferably, the lower seat trim cover 88 or the seat back trim cover 94 comprise a receiving cavity 138 disposed at a front portion 140 of the lower seat trim cover 88 or upper portion 142 of the seat back trim cover 94 that receives a forward portion 144 or upper portion 146 of the foam core 86, 92 of the lower seat cushion module 46 or seat back cushion module 48, respectively. Once the form core 86, 92 has been inserted into the receiving cavity 138 disposed in the trim cover 88, 94, preferably an attachment flap 148 is provided at an opposite edge of the trim cover 88, 94. The attachment flap 148 is preferably adapted to engage the attachment feature 136 on the foam core 86, 92, as shown in FIG. 4. The attachment feature 136 can include a wide variety of configurations, including a tab 150 that engages a reinforced opening 152 in the attachment flap 148 of the trim cover 88, 94, as shown in FIG. 4. The attachment feature 136 can also include snaps, buttons, heat staking, sonic welding, etc.

Once the trim cover 88, 94 has been installed, the lower seat cushion module 46 and seat back cushion module 48 can be provided with additional stylistic and aesthetic treatments. For example, a bezel 154 may be mounted to the exterior of the trim cover 88 about the comfort pad 134 disposed below the trim cover 88 of the lower seat cushion module 46 proximate the buttocks area. Similarly, a bezel 156 may be mounted to the exterior of the trim cover 94 about the lumbar area of the seat back cushion module 48.

It should be noted that the thickness and stiffness of the comfort pads 134 can be selected to create any number of different combinations of seating configurations, enabling the motor vehicle seating assembly 10 to be adapted to a wide variety of applications. Additional elements of support and thermal comfort can be obtained by the use of advanced materials of various sizes and shapes in the lower seat cushion module 46 and seat back cushion module 48 for the material used in the trim cover 88, 94 and the comfort pads 134 in order to enhance comfort and support thermal comfort.

Thus, disclosed herein is a structure and method by which the lower seat 12 and the seat back 14 of a seating assembly 10 may be modified to employ as a design element an EPP-based molded lower seat foam core 86 and seat back foam core 92 nested and attached to the underlying structure of the cushion frame assembly 30 for occupant support and significant reduction in weight. At the same time, low-cost and efficient design opportunities are presented where the lower seat cushion module 46 and the seat back cushion module 48 can be designed as stand-alone modules to support modular assembly on a common JIT line that utilizes the same common core cushion frame assembly 30 as do other mainline program seats, thus enabling an assembled motor vehicle seating structure having lower seat cushion modules 46 and seat back cushion modules 48 that are truly built up and delivered in a modular fashion.

Moreover, it will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the terms "coupled" in all of its forms, couple, coupling, coupled, etc. and "connected" in all of its forms, connect, connecting, connected, etc. generally means the joining of two components electrical or mechanical directly or indirectly to one another. Such joining may be stationary in nature or movable in nature. Such joining may be achieved with the two components electrical or mechanical and any additional intermediate members being integrally formed as a single unitary body with one another or with the two components. Such joining may be permanent in nature or may be removable or releasable in nature unless otherwise stated.

For purposes of this disclosure, the terms "operably coupled" and "operably connected" generally means that one component functions with respect to another component, even if there are other components located between the first and second component, and the term "operable" defines a functional relationship between components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seating assembly for a motor vehicle having a lower seat and a seat back extending upwardly from the lower seat, the vehicle seating assembly comprising:
   a cushion frame assembly having a lower seat cushion frame and a seat back cushion frame;
   a lower seat cushion module mounted to the lower seat cushion frame of the cushion frame assembly, the lower seat cushion module comprising an EPP-based lower seat foam core and a lower seat trim cover fitted about an external surface of at least a portion of the lower seat foam core; and
   a seat back cushion module mounted to the seat back cushion frame of the cushion frame assembly, the seat back cushion module comprising an EPP-based seat back foam core and a seat back trim cover fitted about an external surface of at least a portion of the seat back foam core;
   wherein each of the lower seat cushion frame and the seat back cushion frame of the cushion frame assembly comprises an outer frame and each of the lower seat cushion module and the seat back cushion module comprise an inner bearing surface proximate a pair of lateral outer side edges of each of the lower seat cushion module and the seat back cushion module to create an interference fit with an inner perimeter of the outer frames of the cushion frame assembly; and
   wherein the lower seat cushion frame and the seat back cushion frame of the cushion frame assembly reach comprise side members and a bolster armature mounted on the side members, and wherein the lower seat cushion module and the seat back cushion module each comprise a recess along a lateral outer side edge thereof corresponding with and adapted to receive the bolster armature.

2. The vehicle seating assembly of claim 1, wherein each of the lower seat cushion frame and the seat back cushion frame of the cushion frame assembly comprises an integral outer flange along each of the pair of lateral outer side edges, wherein the integral outer flange is supported by the outer frames of the cushion frame assembly when the lower seat cushion module and the seat back cushion module are assembled with the cushion frame assembly.

3. The vehicle seating assembly of claim 1, wherein at least one of the EPP-based lower seat foam core or the EPP-based seat back foam core comprises an attachment feature for attachment of the lower seat trim cover or seat back trim cover.

4. The vehicle seating assembly of claim 3 wherein at least one of the lower seat trim cover or the seat back trim cover comprise a receiving cavity disposed at a front portion of the lower seat trim cover or an upper portion of the seat back trim cover and an attachment flap at a rear portion of the lower seat trim cover or on the seat back trim cover attachment, wherein the attachment flap is adapted to engage the attachment feature on the at least one of the EPP-based lower seat foam core and the EPP-based seat back foam core.

5. The seat assembly of claim 1, wherein each lower seat cushion module and seta back cushion module has a first lateral width between the inner bearing surfaces proximate the pair of lateral outer side edges and the cushion frame assembly has a second lateral width between the inner perimeter of the cushion frame assembly, wherein the first lateral width exceeds the second lateral width prior to installation of the seat cushion module within the cushion frame assembly.

6. The seat assembly of claim 5, wherein the inner bearing surfaces proximate the pair of lateral outer side edges of the lower seat cushion module and the seat back cushion module further comprises a resilient member that resiliently engages the cushion frame assembly subsequent installation of the seat cushion module within the cushion frame assembly.

7. The seat assembly of claim 1, wherein the recess along the lateral outer side edges of the lower seat cushion module and the seat back cushion module is disposed and molded in within the EPP-based foam core.

8. The vehicle seating assembly of claim 1, wherein the inner bearing surfaces proximate the pair of lateral outer side edges of the lower seat cushion module and seat back cushion module further comprises a resilient member that resiliently engages the lower seat cushion frame and seat back cushion frame of the cushion frame assembly, respectively, subsequent installation of the lower seat cushion module and seat back cushion module within the lower seat cushion frame and the seat back cushion frame of the lower seat cushion frame and the seat back cushion frame of the cushion frame assembly, respectively.

9. A vehicle seating assembly for a motor vehicle having a lower seat and a seat back extending upwardly from the lower seat, the vehicle seating assembly comprising:
   a cushion frame assembly having a lower seat cushion frame and a seat back cushion frame;
   a lower seat cushion module mounted to the lower seat cushion frame of the cushion frame assembly, the lower seat cushion module comprising an EPP-based lower seat foam core and a lower seat trim cover fitted about an external surface of at least a portion of the lower seat foam core; and
   a seat back cushion module mounted to the seat back cushion frame of the cushion frame assembly, the seat back cushion module comprising an EPP-based seat back foam core and a seat back trim cover fitted about an external surface of at least a portion of the seat back foam core;
   wherein each of the lower seat cushion frame and the seat back cushion frame of the cushion frame assembly comprises an outer frame and each of the lower seat cushion module and the seat back cushion module comprise an inner bearing surface proximate a pair of lateral outer side edges of each of the lower seat cushion module and the seat back cushion module to create an interference fit with an inner perimeter of the outer frames of the cushion frame assembly; and wherein each of the lower seat cushion frame and the seat back cushion frame of the cushion frame assembly comprise a pair of parallel lateral outer frame members and each of the parallel lateral outer frame members include a bolster armature and wherein each of the lower seat cushion module and the seat back cushion module comprise a recess along each lateral outer side edge corresponding with and adapted to receive the bolster armature.

10. The vehicle seating assembly of claim 9, wherein the recess along each lateral outer side edge of each of the lower seat cushion module and the seat back cushion module is disposed within and molded-in with each of the EPP-based lower seat foam core and the EPP-based seat back foam core.

11. The vehicle seating assembly of claim 9, wherein each of the EPP-based lower seat foam core and the EPP-based seat back foam core are provided with a plurality of evenly distributed holes.

12. The vehicle seating assembly of claim 11, wherein the plurality of evenly distributed holes forms a regular pattern and each of the plurality of evenly distributed holes is at least 25 mm diameter wide.

13. A vehicle seating assembly for a motor vehicle having a lower seat and a seat back extending upwardly from the lower seat, the vehicle seating assembly comprising:
   a cushion frame assembly having a lower seat cushion frame and a seat back cushion frame;
   a lower seat cushion module mounted to the lower seat cushion frame of the cushion frame assembly, the lower seat cushion module comprising an EPP-based lower seat foam core and a lower seat trim cover fitted about an external surface of at least a portion of the lower seat foam core; and
   a seat back cushion module mounted to the seat back cushion frame of the cushion frame assembly, the seat back cushion module comprising an EPP-based seat back foam core and a seat back trim cover fitted about an external surface of at least a portion of the seat back foam core;
   wherein each of the lower seat cushion module and the seat back cushion module comprise a plurality of planar recesses that are each adapted to receive a die cut comfort pad disposed between each of the EPP-based lower seat foam core and the lower seat trim cover and the EPP-based seat back foam core and the seat back trim cover, respectively; and
   wherein at least one of the EPP-based lower seat foam core and the EPP-based seat back foam core comprises a plurality of trenches disposed between the plurality of planar recesses, each of the plurality of trenches adapted to receive a die cut comfort pad.

14. The vehicle seating assembly of claim 13, wherein the die cut comfort pads comprise die cut pads of variable thicknesses.

* * * * *